US010296861B2

United States Patent
Krantz et al.

(10) Patent No.: US 10,296,861 B2
(45) Date of Patent: May 21, 2019

(54) IDENTIFYING THE EFFECTIVENESS OF A MEETING FROM A MEETINGS GRAPH

(71) Applicant: Microsoft Corporation, Redmond, WA (US)

(72) Inventors: Anton Krantz, Kirkland, WA (US); Ross Garrett Cutler, Redmond, WA (US); Andrew Peter Sinclair, Redmond, WA (US); Jonathan Adam Kauffman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 14/529,519

(22) Filed: Oct. 31, 2014

(65) Prior Publication Data

US 2016/0125346 A1    May 5, 2016

(51) Int. Cl.
*G06Q 10/06* (2012.01)
*G06F 3/0484* (2013.01)

(52) U.S. Cl.
CPC ..... *G06Q 10/06395* (2013.01); *G06F 3/0484* (2013.01)

(58) Field of Classification Search
CPC .......... G06Q 10/0639; G06Q 10/06395; G06F 3/0484
See application file for complete search history.

(56) References Cited

U.S. PATENT DOCUMENTS

| | | | |
|---|---|---|---|
| 7,233,933 B2 | 6/2007 | Horvitz et al. | |
| 7,421,660 B2* | 9/2008 | Charnock | G06F 17/30713 707/999.003 |
| 7,937,287 B2 | 5/2011 | Gaia et al. | |
| 7,962,525 B2 | 6/2011 | Kansal | |
| 8,392,503 B2 | 3/2013 | Kuhlke et al. | |
| 8,484,040 B2 | 7/2013 | Ashour et al. | |
| 8,806,355 B2* | 8/2014 | Twiss | G06Q 10/10 715/751 |
| 8,887,286 B2* | 11/2014 | Dupont | G06F 21/00 726/25 |
| 2004/0103148 A1* | 5/2004 | Aldrich | G09B 7/02 709/204 |
| 2004/0153456 A1* | 8/2004 | Charnock | G06F 17/30713 |
| 2008/0034085 A1* | 2/2008 | Chawla | H04L 12/1831 709/224 |

(Continued)

FOREIGN PATENT DOCUMENTS

WO    2014004224 A1    1/2014

OTHER PUBLICATIONS

Hard, Rob, "Measuring the Value of Events and Meetings through ROI and ROO", Published on: Jun. 10, 2008 Available at: http://eventplanning.about.com/od/eventplanningbasics/a/event-roi.htm.

*Primary Examiner* — Dino Kujundzic

(57) ABSTRACT

Disclosed herein are systems, methods, and software to enhance meeting technology. In an implementation, a meetings graph may be generated for a meeting between various participants in the meeting. An effectiveness of the meeting may be identified based at least in part on a comparison of the meetings graph to a model meetings graph for a model meeting. An indication of the effectiveness of the meeting may then be communicated to at least an application for surfacing in a user interface to the application.

20 Claims, 10 Drawing Sheets

(56) References Cited

U.S. PATENT DOCUMENTS

| | | | |
|---|---|---|---|
| 2008/0255847 A1* | 10/2008 | Moriwaki | G10L 21/06 704/270.1 |
| 2009/0047643 A1 | 2/2009 | Isaac et al. | |
| 2010/0228825 A1 | 9/2010 | Hegde et al. | |
| 2012/0001917 A1* | 1/2012 | Doganata | G06Q 10/00 345/440 |
| 2012/0191500 A1 | 7/2012 | Byrnes et al. | |
| 2013/0132138 A1* | 5/2013 | Doganata | G06Q 10/06 705/7.11 |
| 2013/0132480 A1* | 5/2013 | Tsuji | G06Q 10/06 709/204 |
| 2014/0108085 A1 | 4/2014 | Henriksen et al. | |
| 2015/0134425 A1* | 5/2015 | Legris | G06Q 10/0639 705/7.38 |
| 2016/0035230 A1* | 2/2016 | Spaulding | G09B 5/02 434/236 |

* cited by examiner

US 10,296,861 B2

IDENTIFYING THE EFFECTIVENESS OF A MEETING FROM A MEETINGS GRAPH

TECHNICAL BACKGROUND

A great deal of meeting technology has been developed that accentuates meetings between people and other collaboration opportunities. For example, calendar software allows organizers to invite people to meetings, track their attendance, and distribute content for a meeting, while video conferencing technology allows remote participation in meetings as-if participants were together in one location. A host of other technologies also contributes to ever-improving meeting experiences.

Even when advanced meeting technology is employed, the effectiveness of a given meeting can vary greatly from meeting to meeting. While some meetings are considered very effective, participants may leave other meetings with a sense that a meeting was very ineffective. In a counter-intuitive development, the wide-spread adoption of meeting technology has made it easier than ever to schedule and conduct meetings, which has increased the frequency and volume of ineffective meetings.

Discerning what makes a meeting an effective one versus an ineffective one is a difficult challenge, but some empirical conclusions can be drawn about the effectiveness of a given meeting by observing participant behavior during the meeting. For instance, gaze-tracking technology and speech recognition technology allows participant behavior during a meeting to be observed. Such observations can be studied to determine whether or not a particular meeting was an effective one. In the aggregate, knowledge about an optimal length of time or an optimal number of participants for a meeting may be learned and can be applied when organizing other meetings.

OVERVIEW

Provided herein are systems, methods, and software to enhance meeting technology. In an implementation, a meetings graph may be generated for a meeting between various participants in the meeting. An effectiveness of the meeting may be identified based at least in part on a comparison of the meetings graph to a model meetings graph for a model meeting. An indication of the effectiveness of the meeting may then be communicated to at least an application for surfacing in a user interface to the application.

In such implementations, meeting technology is improved by the use of a meetings graph. User interfaces to applications are also improved by surfacing an indication of the effectiveness of a meeting therein.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
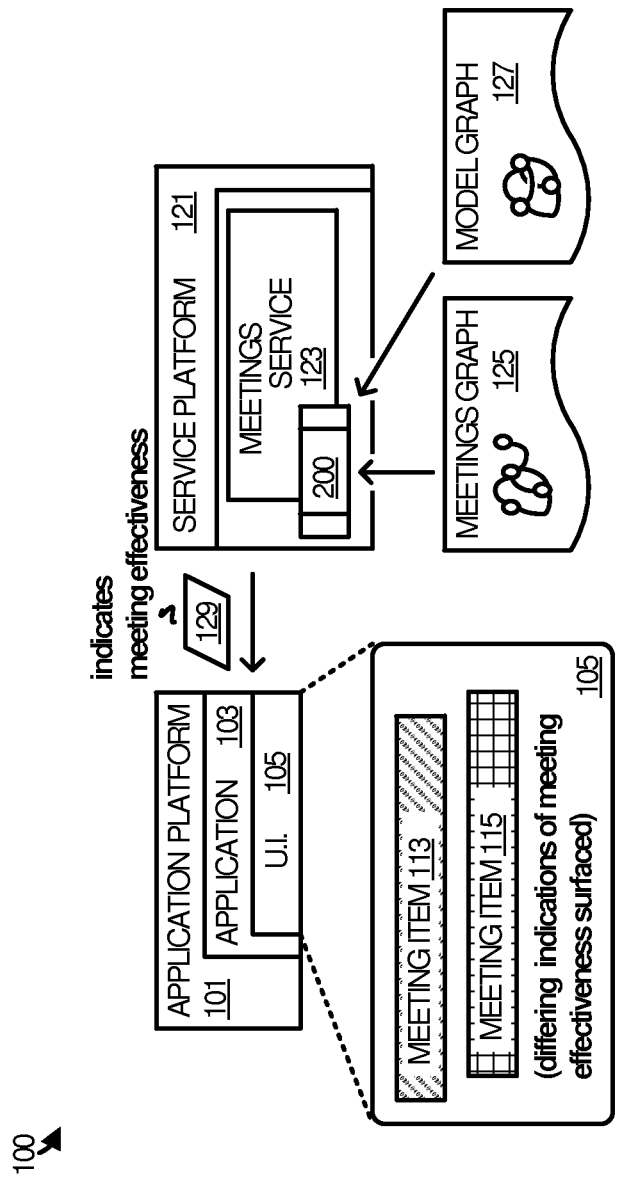
FIG. 1 illustrates a computing architecture and operational scenario in an implementation of enhanced meeting technology.

Implementations disclosed herein enable enhanced meeting technology. A meetings graph is proposed that is representative of a meeting or other collaboration opportunity between various participants. The meetings graph may be evaluated against a model meetings graph to determine the effectiveness of a meeting. Indications of the effectiveness may be surfaced in various user interfaces, thereby enhancing the user experience when scheduling, conducting, and otherwise participating in meetings.

In at least one implementation, a meetings service generates a meetings graph for a meeting between participants in the meeting. The service identifies an effectiveness of the meeting based at least in part on a comparison of the meetings graph to a model meetings graph for a model meeting communicates an indication of the effectiveness of the meeting to an application or applications. The application may surface the indication of the effectiveness of the meeting in a user interface to the application.

In some implementations, the meetings service identifies the effectiveness of the meeting by comparing characteristics of the meetings graph to model characteristics of the model meetings graph. To generate the meetings graph, the meetings service may monitor for events that occur in association with a meeting before, during, and after the meeting and populate the meetings graph with various nodes and edges that are representative of the events.

The events may in some scenarios include an exchange of a document between at least two of the participants in the meeting. The meetings service may communicate the indication of the effectiveness of the meeting to at least one other application for surfacing in one other user interface when the document is being interacted with. For instance, the indication may be communicated when a document is opened, attached to an email, or the like. The application may be a calendar application in some scenarios and the other application may be a productivity application of a different type than the calendar application, such as a word processing application or spreadsheet application.

In various implementations, the effectiveness of the meeting may be representative of an anticipated effectiveness of the meeting that is identified prior to the meeting occurring. The effectiveness of the meeting in some cases be representative of an in-meeting effectiveness of the meeting that is identified while the meeting is occurring. In yet other scenarios, the effectiveness of the meeting may be representative of an ongoing effectiveness of the meeting that is identified after the meeting has occurred. The ongoing effectiveness may be determined once or may be updated periodically.

In one scenario, a calendar application interfaces with a meetings service and receives an indication of an effectiveness of a meeting derived from a comparison of a meetings graph for the meeting and a model meetings graph for a model meeting. The calendar application surfaces the indication of the effectiveness of the meeting in a user interface through which details of the meeting may be viewed and modified. Some implementations may include an auto-improve component in the user interface to the calendar application that, when selected, surfaces various suggestions for improving the effectiveness of the meeting. The suggestions may be determined by the meetings service and communicated to the calendar application.

FIG. 1 illustrates computing architecture 100 and an operational scenario in an implementation of enhanced meeting technology. Computing architecture 100 includes, but is not limited to, application platform 101 and service platform 121. Application platform 101 hosts, executes, or otherwise employs application 103. Application 103 communicates with meetings service 123 hosted by, executed on, or otherwise employed by service platform 121. Meetings service 123 includes graph process 200.

In operation, application platform 101 executes application 103, and in so doing, presents a user interface 105 to application 103. Application 103 may be considered to have rendered user interface 105 separately or in conjunction or cooperation with another application or applications. User interface 105 provides a user with a view of various meeting items, represented by meeting item 113 and meeting item 115. Meeting item 113 is a graphical item that represents a meeting, while meeting item 115 is another graphical item that represents another meeting.

Application 103 communicates with meetings service 123 to obtain information 129 for a given meeting that indicates an effectiveness of the meeting. For example, application 103 may communicate with meetings service 123 to obtain information on the effectiveness of the meeting corresponding to meeting item 113 or other information on the effectiveness of the meeting corresponding to meeting item 115. It may be appreciated that information 129 could optionally include information for more than one meeting. A representation of the effectiveness of a meeting may then be surfaced in user interface 105.

In this scenario, the effectiveness of a meeting is surfaced by way of the background pattern associated with a corresponding meeting item. For example, meeting item 113 has one background pattern, while meeting item 115 has another, different background pattern. This demonstrates that the effectiveness of the meeting corresponding to meeting item 113 differs or differed relative to the meeting effectiveness of meeting item 115. Meeting effectiveness may be surfaced in a variety of ways other than via the background pattern of a graphic item. For instance, an alpha-numeric code may be used to represent meeting effectiveness. A letter, number, or combination thereof could be surfaced in association with a representation of a meeting. Many other ways to surface an indication or representation of meeting effectiveness are possible and may be considered within the scope of the present disclosure.

Figure 2:
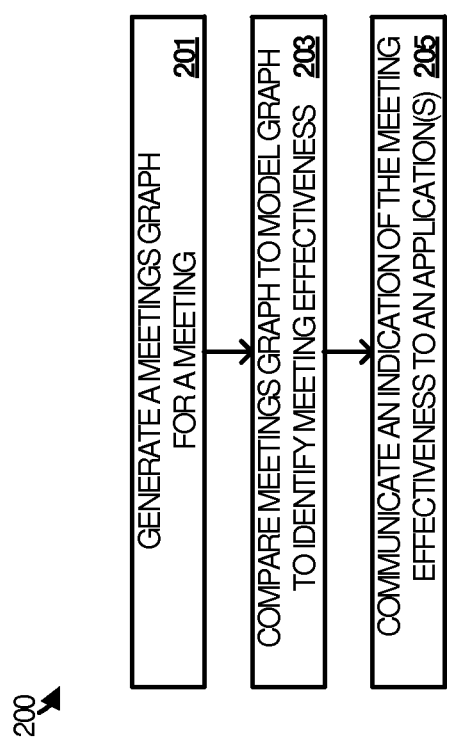
FIG. 2 illustrates a graph process in an implementation.

Meetings service 123 employs graph process 200 when ascertaining the effectiveness of a meeting, a more detailed illustration of which is provided in FIG. 2. The following description of graph process 200 makes parenthetical reference to the steps illustrated in FIG. 2, although it may be appreciated that graph process 200 may include additional functionality. Graph process 200 is representative of any application program, program module, component, or collection thereof through which the steps illustrated in FIG. 2 may be implemented. Graph process 200 may be a stand-alone program or module or may be integrated with or distributed across other programs or modules.

In operation, graph process 200 generates a meetings graph for a meeting (step 201). Meetings graph 125 is representative of one such meetings graph. Meetings graph 125 includes various edges and nodes associated with a meeting. Meetings graph 125 may be derived from a larger graph, such as an enterprise graph or a larger meetings graph. However, meetings graph 125 may also be a self-contained graph that is not derived from any other graph. Other combinations and variations are possible and may be considered within the scope of the present disclosure.

Next, graph process 200 compares the meetings graph to a model meetings graph to identify an effectiveness of the meeting (step 203). Model graph 127 is representative of a model meetings graph and may be compared to meetings graph 125. Comparing the meetings graph may entail, for example, comparing various characteristics of each graph. Characteristics of a graph may include the number of nodes and edges in the graph, the number of edges connecting nodes participating in a meeting with nodes outside of the meeting, the number of edges connecting participating nodes, and so on.

After identifying the effectiveness of a meeting, graph process 200 communicates an indication of the effectiveness to an application for surfacing in a user interface to the application (step 205). Here, meetings service communicates information 129 to application 103. As discussed above, information 129 includes an indication of the effectiveness of a meeting associated with one or both of meeting item 113 and meeting item 115. Application 103 may then surface the indication in user interface 105.

Figure 3:
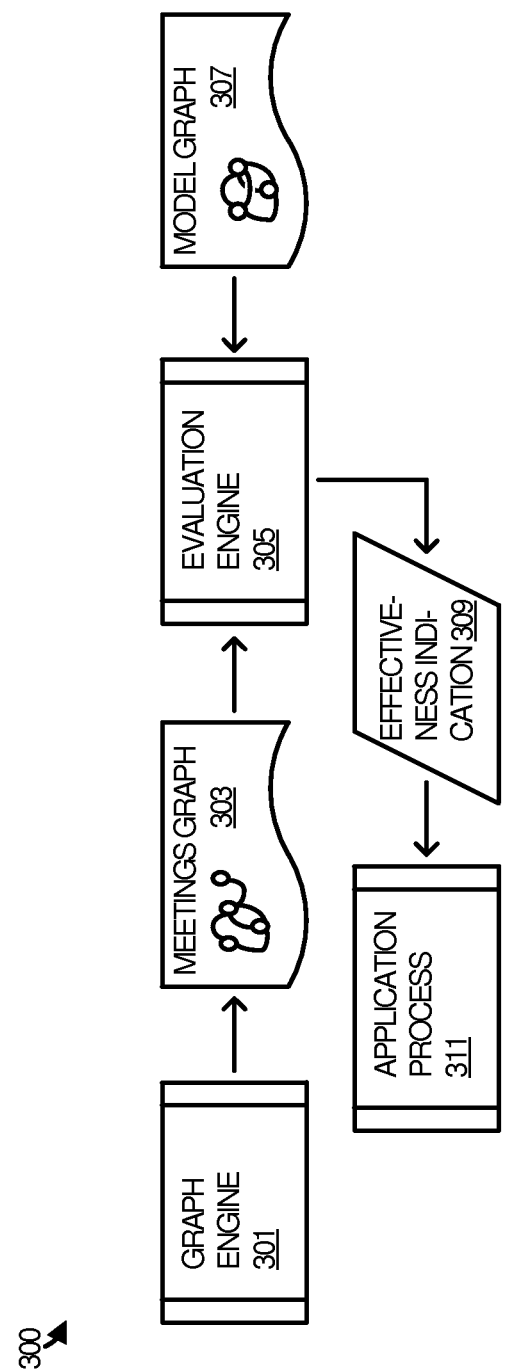
FIG. 3 illustrates an operational scenario in an implementation.

FIG. 3 illustrates an operational scenario 300 to facilitate further understanding of the enhanced meeting technology disclosed herein. Operational scenario 300 involves graph engine 301, evaluation engine 305, and application process 311.

In operation, graph engine 301 generates a meetings graph 303 for a meeting. Meetings graph 303 includes nodes and edges that are representative of the people, documents, and other materials associated with a meeting, as well as the connections there between. For example, meetings graph 303 may include nodes representative of the people invited to the meeting as well as the documents included in an invitation associated with the meeting. The edges in meetings graph 303 express the relationship(s) between the people in the meeting and the documents in the meeting. For instance, one edge may express that a document was included in the invitation for the meeting. Another edge may express that the same document was edited by two participants in the meeting.

Meetings graph 303 may also include some nodes and edges associated with people, documents, or other materials that are not expressly included in the meeting, but that are associated with the meeting nonetheless. For instance, meetings graph 303 may include nodes representative of other documents shared between participants in the meeting, even if those documents were not expressly included in the invitation for the meeting. Meetings graph 303 may thus also include an edge or edges expressive of the sharing relationship associated with the other documents. In another example, meetings graph 303 may include nodes representative of other people not involved in the meeting with whom participants in the meeting called, emailed, or texted during the meeting. Edges may also be included that represent how the other people are connected to the participants in the meeting. Meetings graph 303 may include a wide variety of nodes and edges in place of or in addition to those disclosed here.

Meetings graph 303 is fed into to or is otherwise processed by evaluation engine 305, which compares it to model graph 307. Model graph 307 includes various nodes and edges that are representative of people, documents, and other materials, as well as the relationships there between, that may be found in a model meeting. Model graph 307 and/or the model meeting may be created based on empirical analysis that over time arrives at a model of an effective meeting. The empirical analysis may be derived from a study of a large number of meetings and their associated graphs, as well as a study of the effectiveness of the meetings as experienced by participants in or observers of the meetings.

Evaluation engine 305 compares the characteristics of meetings graph 303 and model graph 307 to determine the effectiveness of the meeting associated with meetings graph 303. Evaluation engine 305, or a related component or module, communicates an effectiveness indication 309 to application process 311. Application process 311 receives the effectiveness indication and initiates surfacing of the indication in a user interface.

In an example, application process 311 surfaces the indication of effectiveness in a user interface to a calendar application. The indication may be surfaced in a daily, weekly, or monthly view of a calendar, for instance. In another example, the indication may be surfaced in a view of an event invitation. The indication of effectiveness may be surfaced before the meeting occurs, during the meeting, or after the occurrence of the meeting.

Figure 8:
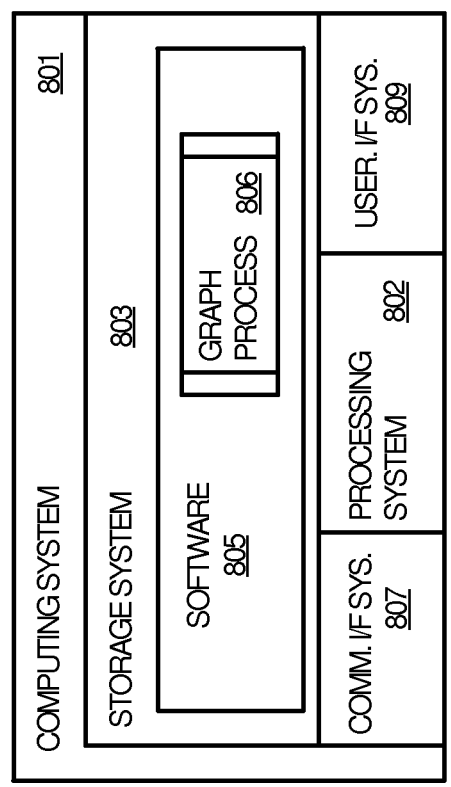
FIG. 8 illustrates a computing system representative of any system or systems suitable for implementing any of the architectures, applications, services, processes, and operational scenarios and sequences disclosed herein with respect to FIGS. 1-7 and discussed in the Technical Disclosure below.

Referring back to FIG. 1, application platform is representative of any physical or virtual computing system, device, or collection thereof capable of hosting an application, such as application 103. Examples include, but are not limited to, server computers, web servers, application servers, rack servers, blade servers, virtual machine servers, laptop computers, tablet computers, desktop computers, hybrid computers, smart phones, gaming machines, smart televisions, entertainment devices, and virtual machines, as well as any variation or combination thereof, of which computing system 801 in FIG. 8 is representative.

Application 103 is representative of any application, module, or component, or collection thereof, capable of communicating with meeting service 123 and surfacing an indication of effectiveness in user interface 105. Examples include, but are not limited to, calendar applications, scheduling applications, email applications, word processing applications, spreadsheet applications, presentation applications, web browsers, blogging and micro-blogging applications, social networking applications, e-commerce applications, and gaming applications, as well as any other type of suitable application.

Application 103 may be a locally installed and executed application, executed in the context of a browser, hosted online, streamed, or delivered in any other suitable manner. Application 103 may be a mobile application, a desktop application, a hybrid application, or any other type, and may be configured for desktops, laptops, tablets, mobile devices, wearable devices, or any other form factor suitable for surfacing an indication of meeting effectiveness.

Service platform 121 is representative of any physical or virtual computing system, device, or collection thereof capable of hosting all or a portion of meetings service 123 and implementing all or portions of graph process 200. Examples of service platform 121 include, but are not limited to, server computers, web servers, application servers, rack servers, blade servers, and virtual machine servers, as well as any other type of computing system, of which computing system 801 illustrated in FIG. 8 is representative. In some scenarios, service platform 121 may be implemented in a data center, a virtual data center, or some other suitable facility.

Meetings service 123 is representative of any service or services capable of employing graph process 200 and communicating with application 103. Meetings service 123 may be a single, stand-alone service, or may be comprised of multiple services. In some implementations, meetings service 123 may be integrated with another service or services or its functionality may be distributed across multiple services. Examples of such services include, but are not limited to, email and calendar services, unified communication services, productivity services, e-commerce services, and gaming services.

Figure 4:
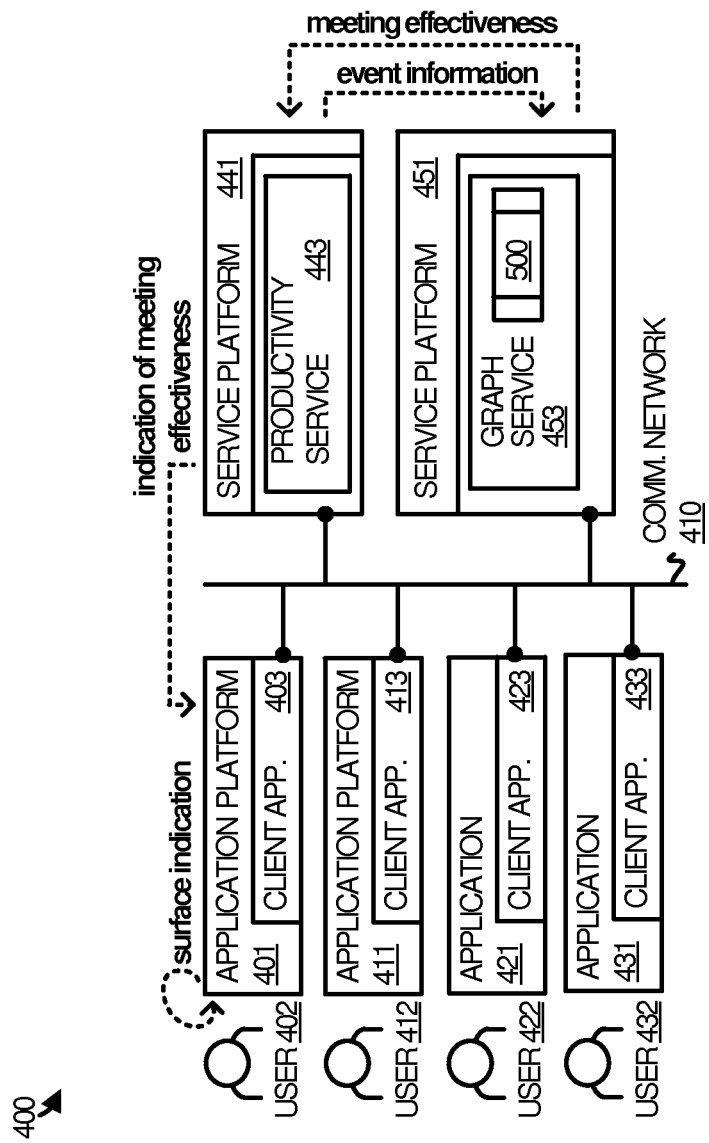
FIG. 4 illustrates a computing architecture and operational scenario in an implementation of enhanced meeting technology.

FIG. 4 illustrates computing architecture 400 in another implementation of enhanced meeting technology. Computing architecture 400 includes application platform 401, application platform 411, application platform 421, and application platform 431. Application platform 401 hosts, executes, or otherwise employs client application 403. Client application 403 is representative of any client application that may interact with productivity service 443, hosted on service platform 441. Client application 403 interacts with productivity service 443 in order to provide user 402 to allow user 402 to initiate, participate in, or otherwise experience meetings. Office365® from Microsoft® is one example of such productivity services.

Client applications 413, 423, and 433 are hosted on application platforms 411, 421, and 431 respectively. User 412, user 422, and user 432 may also access productivity service via client applications 413, 423, and 433 respectively.

Computing architecture 400 also includes service platform 451 on which graph service 453 is hosted. Graph service 453 is illustrated in this implementation as separate from productivity service 443, although in other implementations the services may be integrated together or distributed across yet other services. Communication network 410 is representative of any network or networks over which the elements of computing architecture 400 may communicate, including intranets, internets, the Internet, wired networks, wireless networks, virtual networks, and any combination or variation thereof.

In operation, graph service 453 captures event information generated by productivity service 443 in order to build a graph or graphs with which meeting effectiveness may be determined In some cases, graph service 453 may maintain an enterprise graph or some other large-scale graph that represents a wide variety of events that occur in an enterprise, and from which smaller scale meetings graphs may be derived. In other cases, graph service 453 may maintain a meetings-specific graph that represents only a subset of enterprise events that may be relevant to developing a meetings graph or graphs.

Productivity service 443 can solicit information from graph service 453 that users may find useful when interacting with a service or services. In particular, productivity service 443 may solicit graph service 453 for information indicative of the effectiveness of a particular meeting. Productivity service 443 can then communicate the indication to any of client applications 403, 413, 423 and 433 to which it may be relevant for surfacing in their corresponding user interfaces. In some implementations graph service 453 may push such information in an unsolicited manner, rather than having productivity service 443 solicit it.

Figure 5:
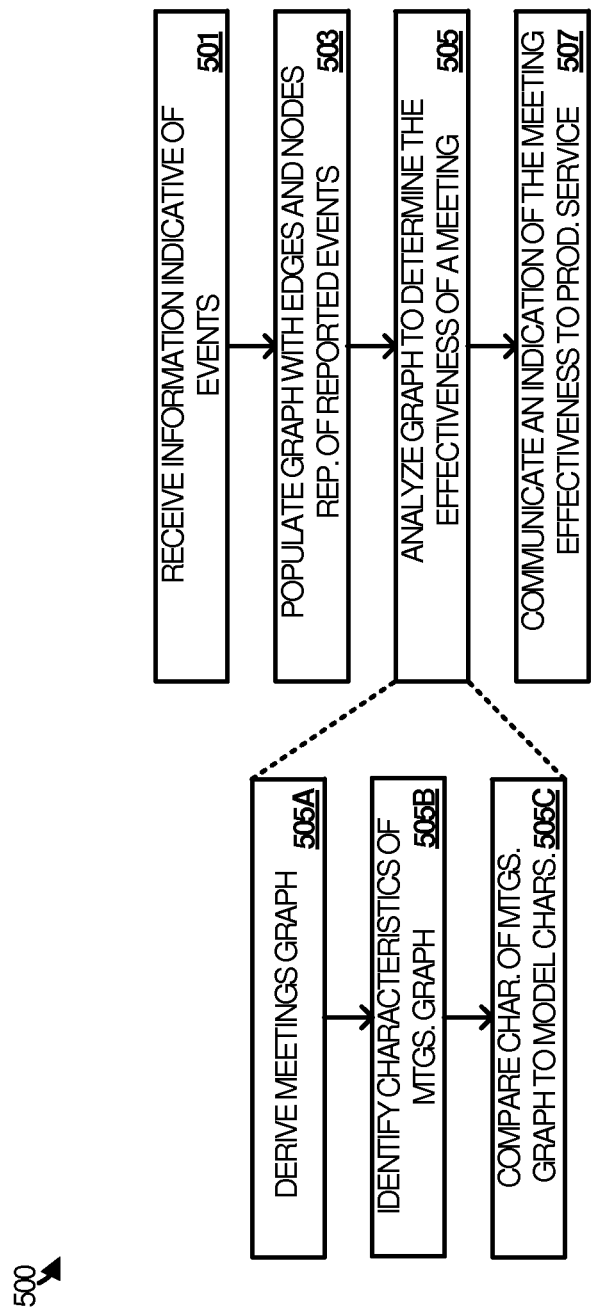
FIG. 5 illustrates a graph process in an implementation.

FIG. 5 illustrate graph process 500, which is employed by graph service 453 to ascertain the effectiveness of a meeting. The following description of graph process 500 makes parenthetical reference to the steps illustrated in FIG. 5, although it may be appreciated that graph process 500 may include additional functionality. Graph process 500 is representative of any application program, program module, or collection thereof through which the steps illustrated in FIG. 5 may be carried out. Graph process 500 may be a standalone program or module or may be integrated with or distributed across other programs or modules.

In operation, graph process 500 receives information from productivity service 443 that is indicative of events that are occurring (step 501). Examples of events include, but are not limited to, meetings being scheduled, phone calls that are made, text messages that are sent, and documents being created, edited, and shared, as well as any other event that may be captured in a graph. Graph process 500 populates a meetings graph with nodes and edges that represent the captured events (step 503) associated with a meeting or meetings.

A resulting graph may then be analyzed to determine the effectiveness of a given meeting (step 505). This may involve various sub-steps in some implementations, including deriving the meetings graph from a larger meetings graph or a larger enterprise graph (step 505A). After driving the meetings graph, characteristics of the meetings graph are identified (step 505B). Characteristics of a graph may include the number of nodes and edges in the graph, the number of edges connecting nodes participating in a meeting with nodes outside of the meeting, the number of edges connecting participating nodes, and so on. The characteristics of the meetings graph may be compared to the characteristics of meetings graph model (step 505C).

In a brief example, a model meetings graph may include a certain number of edges connecting participating nodes to nodes outside of the meeting. Such edges may be established when during a meeting a participant communicates by email, text, or otherwise with someone else outside of the meeting. The occurrence of a quantity of such edges in a meetings graph that exceeds the quantity of such edges in a model graph may indicate that the meeting was less effective than the model meeting associated with the model graph. Conversely, the occurrence of few such edges in a meetings graph than in a model graph may indicate that the subject meeting was more effective than the model meeting.

In another example, a model meetings graph may include a certain number of nodes representative of documents associated with a model meeting. The occurrence of a quantity of such document nodes in a meetings graph that greatly exceeds the quantity of document nodes in a model meetings graph may indicate that the subject meeting is less effective than the model graph. A quantity much lower than that found in a meetings graph may also indicate that the subject meeting was less effective. However, a quantity of document nodes in a meetings graph that falls within a range around the quantity of document nodes in the model graph may indicate that the subject meeting was a comparatively effective meeting relative to the model meeting.

A variety of other characteristics of a meetings graph and a model meetings graph may be utilized when determining the effectiveness of a meeting and may be considered within the scope of the present disclosure. In addition, a variety of criteria in place of or in addition to those disclosed herein may be utilized when determining the effectiveness of a meeting and may be considered within the scope of the disclosure.

Upon identifying the effectiveness of a meeting, graph process 500 communicates an indication of such to productivity service 443. Productivity service 443 may then distribute the indication to one or more of client applications 403, 413, 423, and 433 as relevant for surfacing in their corresponding user interfaces.

Figure 6A:
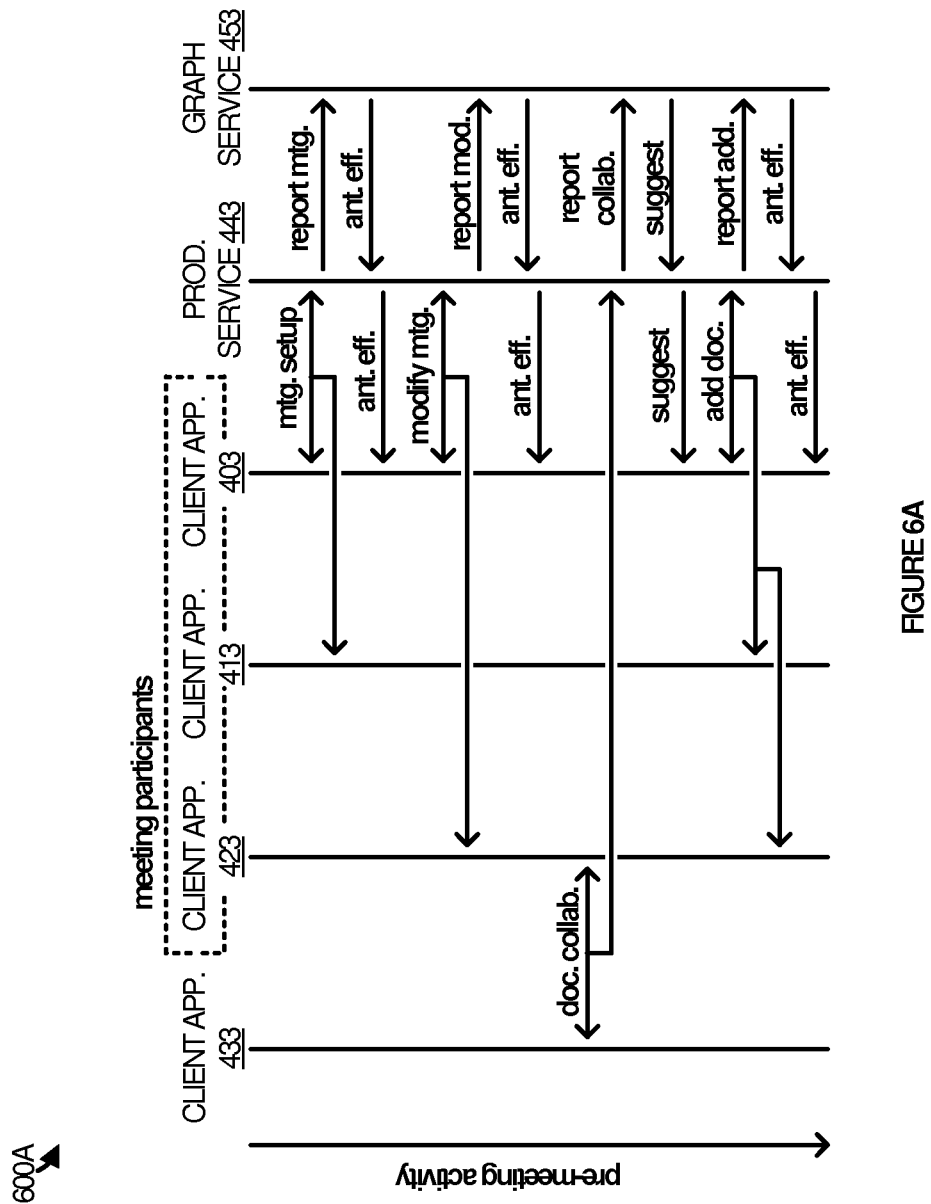
FIGS. 6A-6C illustrate an operational sequence in an implementation.
Figure 6B:
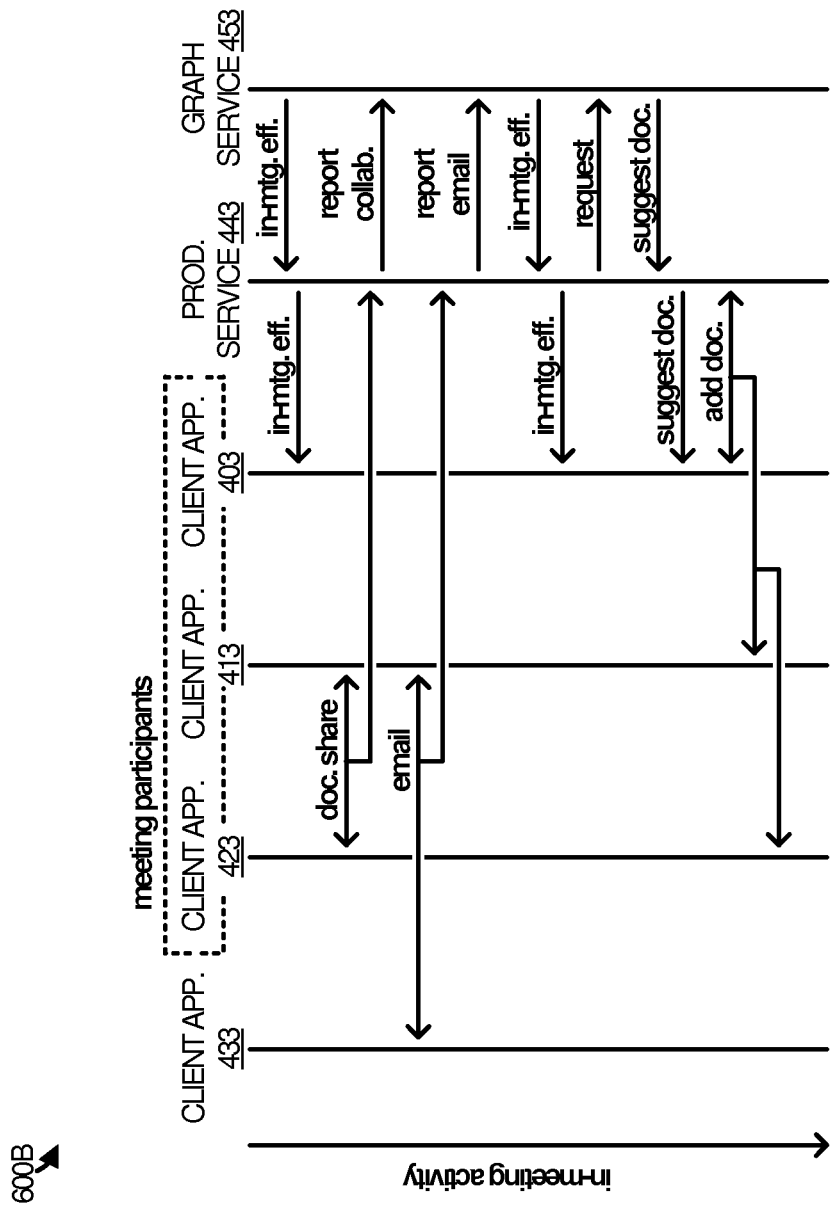
Figure 6C:
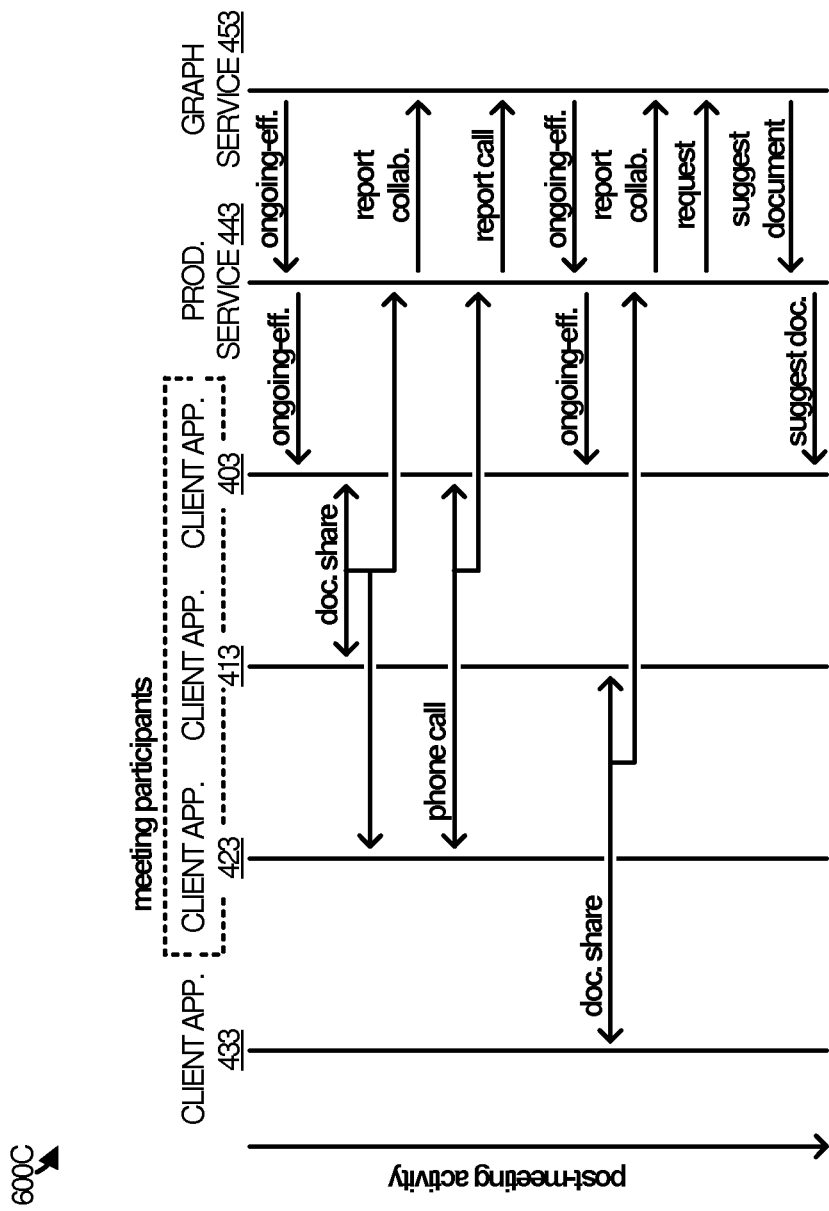

FIGS. 6A-6C illustrate an operational sequence in an implementation of enhanced meeting technology. The operational sequence involves three stages of a meeting: before, during, and after the meeting. FIG. 6A illustrates various pre-meeting activity; FIG. 6B illustrates in-meeting activity; and FIG. 6C illustrates post-meeting or ongoing meeting activity.

Referring to stage 600A in FIG. 6A, user 402 engages in setting up a meeting via client application 403. Client application 403 communicates with client application 413 in order to invite user 412 to the meeting. Client application 403 and client application 413 may communicate via productivity service 443. The meeting is reported by productivity service 443 to graph service 453. Graph service 453 responsible begins to construct a meetings graph for the meeting.

In addition, graph service 453 communicates an indication of the anticipated effectiveness of the meeting to productivity service 443. Productivity service receives the indication and forwards it on to client application 403. Client application 403 surfaces the indication of meeting effectiveness for user 402 to view and consider. It is assumed for exemplary purposes that user 402 decides to change certain aspects of the meeting in view of how ineffective (or effective) the meeting is considered to be. Accordingly, user 422 is invited to join meeting by way of an invite exchange between client application 403 and client application 423 through productivity service 443.

Productivity service 443 also reports the new invitation to graph service 453, which updates the meetings graph accordingly. The anticipated effectiveness of the meeting is revised by graph service 453 in view of the new invitee and an updated indication of the anticipated effectiveness is communicated to client application 403. Client application 403 may surface the updated indication in a user interface for consideration by user 402.

Only three people are invited to the meeting in this example: user 402, user 412, and user 422. User 432, who is engaged with client application 433, is not invited to the meeting. However, user 432 may still exchange documents with, email, or call those users who are participants in the meeting. This type of interaction is represented by the document collaboration illustrated in FIG. 6A between client application 433 and client application 423. Such collaboration is reported by productivity service 443 to graph service 453. Graph service 453 populates the meetings graph with nodes and edges representative of such events.

Graph service 453 is capable of providing suggestions to users to help improve the effectiveness of a meeting, whether before, during, or after a meeting. Here, graph service 453 notices from the reported collaboration that the document shared between user 432 and user 422 may be relevant to the meeting. Graph service 453 communicates a suggestion to client application 403 to add the document to the meeting. User 402 consumes the suggestions and responsively attaches the document to the invitation to the meeting, which is sent out to client application 413 and client application 423. A new or updated anticipated effectiveness for the meeting is then calculated by graph service 453 and communicated to productivity service 443 for surfacing by client application 403.

It may be appreciated from the discussion of FIG. 6A that the anticipated effectiveness of the meeting is improved during the course of pre-meeting preparation. First, an initial meeting effectiveness is established. User 422 is added to the meeting after the anticipated effectiveness is surfaced to user 402. The second opportunity is after the suggestion is made to add the document. Thus, whereas the meeting began as a relatively ineffective meeting between two people with no document collaboration, the meeting ended up as a meeting between three people discussing a relevant document.

Referring to stage 600B in FIG. 6B, various in-meeting activity is illustrated. Once the meeting has commenced at its designated time, an in-meeting effectiveness indication is provided to client application 403 by way of productivity service 443 and graph service 453. Client application 403 may surface the indication for consumption by user 402. User 402 is presumably the organizer of the meeting and as such may be interested in viewing the indication of in-meeting effectiveness, although the indication may be provided to any or all of the other participants in the meeting.

A document is shared during the meeting between user 422 and user 412 via client applications 423 and 413 respectfully. This event is captured by graph service 453 and is added to the meetings graph for the meeting. In addition, an email is exchanged between user 412 and user 432 via client application 413 and 433. This event is also captured by graph service 453 and is added to the meetings graph.

A subsequent in-meeting indication of meeting effectiveness is calculated by graph service 453 and is provided to client application 403. The subsequent indication takes into account both the shared document and the email. User 402 may initiate a request to view suggestions for improving the in-meeting effectiveness of the meeting. In response, graph service 453 identifies the document as something that, if added to the meeting, may improve the effectiveness of the meeting.

The fact that an email or some other communication was exchanged during the meeting may or may not impact its effectiveness. In some cases, a suggestion to improve the effectiveness may include a script or hint to remind participants to refrain from or otherwise limit their email activity during the meeting. Some implementations may include an automated feature that reminds participants not to email, text, or engage with others outside of the meeting in a way that decreases the effectiveness of a meeting. For example, a participant that is email a great deal during the meeting could receive an email from graph service 453 reminding he or she to not email during the meeting.

In this example, user 402 decides to include the shared document in the meeting. An email, updated invite, or some other communication is sent out to the other participants that includes an attachment or a link associated with the document.

Stage 600C is illustrated in FIG. 6C and pertains to activities that may occur post-meeting. Once the meeting has ended, graph service calculates 453 an "ongoing" effectiveness of the meeting. The term "ongoing" is used to connote that how effective a meeting was cannot necessarily be measured or ascertained immediately after the meeting. Rather, as time passes by after a meeting, it may become clearer whether or not a meeting was effective. Such an insight can be arrived at by examining the meetings graph for the meeting and building on it even after a meeting is over.

Here, activity may continue to occur after the meeting that can be associated with the meeting. The meetings graph is populated with edges and nodes that reflect these after-meeting events. For example, user 412 and user 402 share a document, the fact of which is reported to graph service 453. In addition, user 422 and user 402 engage in a phone call with each other. These and other events may be reported to graph service 453. Graph service 453 can periodically, occasionally, or with some other frequency calculate the ongoing effectiveness of the meeting. An indication of the ongoing effectiveness is communicated to client application 403 via productivity service 443 and may be surfaced in a user interface for consumption by user 402.

Other features may also be available even after a meeting has ended. For example, suggestions can be made for improving the ongoing effectiveness of a meeting. In this example, a document is shared between user 432 and user 412, the fact of which is reported to graph service 453. User 402 may select a menu feature or other such option in the user interface to client application 403 requesting a suggestion or suggestions for improving the ongoing meeting effectiveness. Graph service 453 identifies the recently-shared document as something that might be useful for improving the ongoing meeting effectiveness. The document is identified to client application 403 and a representation is surface in a user interface.

Figure 7A:
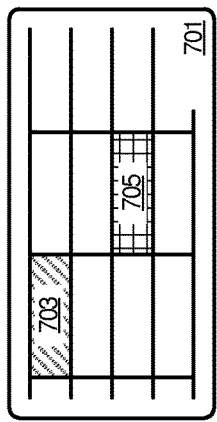
FIGS. 7A-7C illustrate user interfaces in several implementations.
Figure 7B:
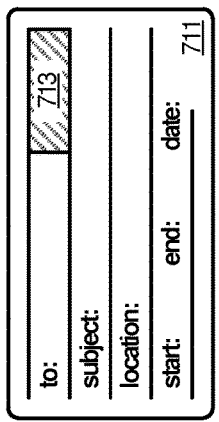
Figure 7C:
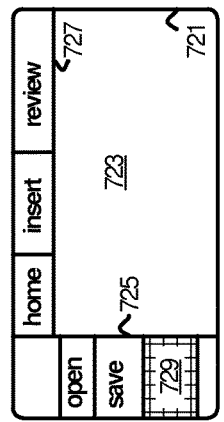

FIGS. 7A-7C illustrate three different user interfaces to three different applications respectfully. Indications of meeting effectiveness are illustrated in each of the user interfaces and in different ways to demonstrate how a variety applications may surface indications of meeting effectiveness.

FIG. 7A illustrates user interface 701, which is representative of a user interface to a calendar application. User interface 701 includes a grid, which is representative of a grid that may be found in a daily, weekly, or monthly view of a calendar. Two meeting items 703 and 705 are included in user interface 701. The meeting items 703 and 705 each have different background fill patterns to represent two different levels of meeting effectiveness. Thus, a user can glance at the user interface to his or her calendar to ascertain how well the effectiveness of a meeting may be developing, whether it be an anticipated effectiveness, in-meeting effectiveness, or ongoing effectiveness.

FIG. 7B illustrates a user interface 711 to a meeting invite. The meeting invite includes various fields that identify details of the meeting, including TO, SUBJECT, LOCATION, START, END, and DATE fields. Other fields are possible in place of or in addition to those disclosed herein and may be considered within the scope of the present disclosure. User interface 711 also includes a graphic item 713 through which an indication of the effectiveness of a meeting may be surfaced. The appearance of graphic item 713 can be modified dynamically to reflect changes in meeting effectiveness. For instance, the background pattern, shading, or other characteristics could be changed. Other ways to represent meeting effectiveness are possible, such as alphanumeric symbols and the like.

FIG. 7C illustrates user interface 721 in an implementation. User interface 721 is representative of a user interface to a productivity application, such as a word processing, spreadsheet, or presentation application. User interface 721 includes a canvas 723 for creating content, a function menu 725, and another function menu 727.

User interface 721 also includes graph item 729 through which an indication of meeting effectiveness may be surfaced. For example, a user may open a document in user interface 721. If the document was one associated with a meeting, the effectiveness of the meeting can be indicated via graph item 729. This allows a user to quickly recall whether or not including the document in a previous meeting contributed to the effectiveness of the meeting. Such a tool may contribute to the user deciding to include the document again with respect to another meeting or to possible refrain from including it.

Referring back to FIG. 4, application platforms 401, 411, 421, and 431 are each representative of any physical or virtual computing system, device, or collection thereof capable of hosting an application, such as client applications 403, 413, 423, and 433 respectively. Service platform 441 is representative of any physical or virtual computing system, device, or collection thereof capable of hosting an application service, such as productivity service 443. Service platform 451 is representative of any physical or virtual computing system, device, or collection thereof capable of hosting graph service 453. Computing system 801 in FIG. 8 is representative of any computing system suitable for implementing the aforementioned application platforms and service platforms.

Client applications 403, 413, 423, and 433 are each representative of any client application capable of interacting with productivity service 443 and surfacing indications of meeting effectiveness in a user interface. Examples include, but are not limited to, word processing applications, spreadsheet applications, presentation applications, web browsers, email applications, calendar applications, blogging and micro-blogging applications, social networking applications, e-commerce applications, and gaming applications, as well as any other suitable application.

Client applications 403, 413, and 423 may each be a locally installed and executed application, executed in the context of a browser, hosted online, streamed, or delivered in any other suitable manner. Each application may be a mobile application, a desktop application, a hybrid application, or any other type, and may be configured for desktops, laptops, tablets, mobile devices, wearable devices, or any other form factor suitable for surfacing an indication of meeting effectiveness.

Productivity service 443 is representative of any service capable of interacting with client applications 403, 413, 423, and 423 and graph service 453. Examples of productivity service 443 include, but are not limited to, office productivity services, email and calendar services services, search services, e-commerce services, gaming services, information technology services, media services, and any other type of service. Productivity service 443 may in some implementations be integrated or combined with graph service 453 as a single service. In addition, service platform 441 may in some cases be integrated or combined with service platform 451.

FIG. 8 illustrates a computing system 801 that is representative of any computing systems or systems with which the various operational architectures, processes, scenarios, and sequences disclosed herein may be implemented. Examples of computing system 801 include, but are not limited to, server computers, web servers, application servers, rack servers, blade servers, virtual servers, desktop computers, work stations, laptop computers, tablet computers, smart phones, hybrid computers, gaming machines, virtual machines, smart televisions, and watches and other wearable devices, as well as any variation or combination thereof. In some implementations, a collection of multiple computing systems may be employed to implement all or portions of an application or service which may be hosted in one or more data centers, virtual data centers, or any other suitable computing facilities.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. When executed by processing system 802 to implement enhanced meeting technology, software 805 directs processing system 802 to operate as described herein for the various processes, operational scenarios, and sequences discussed in the foregoing implementations. Computing system 801 may optionally include additional devices, features, or functionality not discussed for purposes of brevity.

Referring still to FIG. 8, processing system 802 may comprise a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 includes graph process 806, which is representative of graph processes 200 and 500. Software 805 in general, and graph process 806 in particular, may be implemented in program instructions that among other functions may, when executed by processing system 802, direct processing system 802 to operate as described with respect to the various operational scenarios, sequences, and processes illustrated herein.

The program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to facilitate enhanced meeting technology. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIGS. 1-3 as an example, through the operation of a computing system or systems of which computing system 801 is representative, transformations may be performed with respect to one or both of meeting items 113 and 115. In a first state, the visual appearance of a meeting item may reflect the effectiveness of an associated meeting. When the effectiveness of the meeting changes and increases or decreases, the visual appearance of the meeting item may also change to reflect the updated effectiveness of the meeting. In another example in FIGS. 4-7, a meeting may be setup initially such that it has an associated meeting effectiveness. Then, the meeting may be changed, such as by adding participants and content, thereby changing its effectiveness.

It may be understood that computing system 801 is generally intended to represent a computing system or systems on which software 805 may be deployed and executed in order to implement graph process 806. However, computing system 801 may also be suitable as any computing system on which software 805 may be staged and from where one or both may be distributed, transported, downloaded, or otherwise provided to yet another computing system for deployment and execution, or yet additional distribution.

Communication interface system 807 may include communication connections and devices that allow for communication with other computing systems over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface. For example, user interface 105, user interface 701, user interface 711, and user interface 721 presented through user interface system 809. In addition, user input made with respect to the user interfaces can be input via user interface system 809.

Communication between computing system 801 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), HTTPS (HTTP secure), SOAP (simply object access protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-8 generally depict relatively few users and relatively few instances of service platforms, application platforms, applications, and services, it may be appreciated that the concepts disclosed herein may be applied at scale. For example, the graph processes disclosed herein could be deployed in support of any number of events, meetings, activity, applications, services, and instances thereof.

Various improvements to meeting technology may be appreciated from the foregoing implementations. The ability to utilize a meetings graph and a model meetings graph to evaluate the effectiveness of meetings improves existing meeting technology, such as calendar software and other productivity software. An effectiveness of a meeting may be determined using the graphs and may be surfaced in user interfaces to calendar applications, productivity applications, and the like. Such technical effects improve the functioning of such applications and enhance the user experience when scheduling, conducting, and reviewing meetings.

Certain inventive aspects may be appreciated from the foregoing disclosure, of which the following are various examples.

Example 1

One or more computer readable storage media having program instructions stored thereon for enhancing meeting technology that, when executed by a processing system, direct the processing system to at least generate a meetings graph for a meeting between a plurality of participants; identify an indication of effectiveness for the meeting based at least in part on a comparison of the meetings graph to a model meetings graph for a model meeting; and communicate an indication of the effectiveness of the meeting to at least an application for surfacing in a user interface to the application.

Example 2

The one or more computer readable storage media of Example 1 wherein to identify the effectiveness of the meeting based at least in part on the comparison of the meetings graph to the model meetings graph, the program instructions direct the processing system to compare characteristics of the meetings graph to model characteristics of the model meetings graph.

Example 3

The one or more computer readable storage media of Examples 1-2 wherein to generate the meetings graph, the program instructions direct the processing system to monitor for events that occur in association with the meeting before, during, and after the meeting and to populate the meetings graph with a plurality of nodes and a plurality of edges representative of the plurality of events.

Example 4

The one or more computer readable storage media of Examples 1-3 wherein the plurality of events includes at least an exchange of a document between at least two of the plurality of participants and wherein the program instructions further direct the processing system to communicate the indication of the effectiveness of the meeting to at least one other application for surfacing in one other user interface to the other application when interacting with the document, wherein the application comprises a calendar application and the other application comprises a productivity application of a different type than the calendar application.

Example 5

The one or more computer readable storage media of Examples 1-4 wherein the effectiveness of the meeting comprises an anticipated effectiveness of the meeting and wherein to identify the effectiveness of the meeting, the program instructions direct the processing system to identify the anticipated effectiveness of the meeting prior to the meeting occurring.

Example 6

The one or more computer readable storage media of Examples 1-5 wherein the effectiveness of the meeting further comprises an in-meeting effectiveness of the meeting and wherein to identify the effectiveness of the meeting, the program instructions direct the processing system to identify the in-meeting effectiveness of the meeting while the meeting is occurring.

Example 7

The one or more computer readable storage media of Examples 1-6 wherein the effectiveness of the meeting further comprises an ongoing effectiveness of the meeting and wherein to identify the effectiveness of the meeting, the program instructions direct the processing system to identify the ongoing effectiveness of the meeting after the meeting has occurred.

Example 8

The one or more computer readable storage media of claim Examples 1-7 wherein the user interface includes an auto-improve component that, when selected, surfaces a plurality of suggestions for improving the effectiveness of the meeting.

Example 9

A method for enhancing meeting technology, the method comprising generating a meetings graph for a meeting comprising a plurality of participants; identifying an effectiveness of the meeting based at least in part on a comparison of the meetings graph to a model meetings graph representative of an effective meeting; and surfacing an indication of the effectiveness of the meeting in a user interface.

Example 10

The method of Example 9 wherein identifying the effectiveness of the meeting based at least in part on the comparison of the meetings graph to the model meetings graph comprises comparing characteristics of the meetings graph to model characteristics of the model meetings graph.

Example 11

The method of Examples 9-10 wherein generating the meetings graph comprises monitoring for events that occur in association with the meeting before, during, and after the meeting and populating the meetings graph with a plurality of nodes and a plurality of edges representative of the plurality of events.

Example 12

The method of Examples 9-11 further comprising surfacing the indication of the effectiveness of the meeting in at least one other user interface, wherein the user interface comprises a user interface rendered by a calendar application and wherein the other user interface comprises a user interface rendered by a productivity application other than the calendar application.

Example 13

The method of Examples 9-12 wherein the plurality of events includes at least an exchange of a document between at least two of the plurality of participants and wherein surfacing the indication of the effectiveness of the meeting comprises surfacing the indication of the effectiveness of the meeting in the user interface rendered by the productivity application when accessing the document with the productivity application.

Example 14

The method of Examples 9-13 wherein the effectiveness of the meeting comprises an anticipated effectiveness of the meeting and wherein identifying the effectiveness of the meeting comprises identifying the anticipated effectiveness of the meeting prior to the meeting occurring.

Example 15

The method of Examples 9-14 wherein the effectiveness of the meeting further comprises an in-meeting effectiveness of the meeting and wherein identifying the effectiveness of the meeting comprises identifying the in-meeting effectiveness of the meeting while the meeting is occurring.

Example 16

The method of Examples 9-15 wherein the effectiveness of the meeting further comprises an ongoing effectiveness of the meeting and wherein identifying the effectiveness of the meeting comprises identifying the ongoing effectiveness of the meeting after the meeting has occurred.

Example 17

The method of Examples 9-16 wherein surfacing the indication of the effectiveness of the meeting in the user interface comprises surfacing at least one of an indication of the anticipated effectiveness of the meeting, an indication of the in-meeting effectiveness of the meeting, and an indication of the ongoing effectiveness of the meeting.

Example 18

An apparatus comprising one or more computer readable storage media and program instructions stored on the one or more computer readable storage media that, when executed by a processing system, direct the processing system to at least: receive an indication of an effectiveness of a meeting derived from a comparison of a meetings graph for the meeting and a model meetings graph for a model meeting; and surface the indication of the effectiveness of the meeting in a user interface to a calendar application through which to view and modify details of the meeting.

Example 19

The apparatus of Example 18 further comprising the processing system that reads and executes the program instructions, wherein the effectiveness of the meeting comprises an anticipated effectiveness of the meeting, and wherein the program instructions further direct the processing system to surface at least a suggestion in the user interface for improving the anticipated effectiveness of the meeting prior to the meeting occurring.

Example 20

The apparatus of Examples 18-19 wherein the effectiveness of the meeting further comprises an ongoing effectiveness of the meeting, and wherein the program instructions further direct the processing system to surface at least a suggestion in the user interface for improving the ongoing effectiveness of the meeting after the meeting has occurred.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for enhancing meeting technology that, when executed by a processing system, direct the processing system to at least:
generate a meetings graph for a meeting between a plurality of participants, wherein the meetings graph comprises nodes and edges, wherein the edges comprise a relationship between nodes, and wherein nodes comprise participants, non-participants, documents, or other materials associated with the meeting;
monitor for a plurality of events that occur in association with the meeting at least before the meeting and after the meeting;

populate the meetings graph with the nodes and the edges representative of the plurality of events;

identify an indication of an effectiveness for the meeting based at least in part on a comparison of the edges of the meetings graph to edges of a model meetings graph for a model meeting; and communicate the indication of the effectiveness of the meeting to at least an application for surfacing in a user interface to the application.

2. The one or more computer readable storage media of claim 1 wherein to communicate the indication of the effectiveness of the meeting to the application for surfacing in the user interface to the application, the program instructions direct the processing system to communicate the indication of the effectiveness of the meeting to at least one other application for surfacing in one other user interface to the other application, wherein the application comprises a calendar application and the other application comprises a productivity application of a different type than the calendar application.

3. The one or more computer readable storage media of claim 1 wherein the plurality of events includes at least an exchange of the document between at least two of the plurality of participants.

4. The one or more computer readable storage media of claim 1 wherein the effectiveness of the meeting comprises an anticipated effectiveness of the meeting and wherein to identify the effectiveness of the meeting, the program instructions direct the processing system to identify the anticipated effectiveness of the meeting prior to the meeting occurring.

5. The one or more computer readable storage media of claim 4 wherein the effectiveness of the meeting further comprises an in-meeting effectiveness of the meeting and wherein to identify the effectiveness of the meeting, the program instructions direct the processing system to identify the in-meeting effectiveness of the meeting while the meeting is occurring.

6. The one or more computer readable storage media of claim 5 wherein the effectiveness of the meeting further comprises an ongoing effectiveness of the meeting and wherein to identify the effectiveness of the meeting, the program instructions direct the processing system to identify the ongoing effectiveness of the meeting after the meeting has occurred.

7. The one or more computer readable storage media of claim 1 wherein the user interface includes an auto-improve component that, when selected, surfaces a plurality of suggestions for improving the effectiveness of the meeting.

8. A method for enhancing meeting technology, the method comprising:

generating a meetings graph for a meeting comprising a plurality of participants, wherein the meetings graph comprises nodes and edges, wherein the edges comprise a relationship between nodes, and wherein nodes comprise participants, non-participants, documents, or other materials associated with the meeting;

monitoring for a plurality of events that occur in association with the meeting at least before the meeting and after the meeting;

populating the meetings graph with the nodes and the edges representative of the plurality of events;

identifying an effectiveness of the meeting based at least in part a comparison of the edges of the meetings graph to edges of a model meetings graph representative of an effective meeting; and surfacing an indication of the effectiveness of the meeting in a user interface to an application and to at least one other application for surfacing in one other user interface to the other application when interacting with a document, wherein the application comprises a calendar application and the other application comprises a productivity application of a different type than the calendar application.

9. The method of claim 8 wherein the user interface includes an auto-improve component that, when selected, surfaces a plurality of suggestions for improving the effectiveness of the meeting.

10. The method of claim 8 wherein the plurality of events includes at least an exchange of a document between at least two of the plurality of participants and wherein surfacing the indication of the effectiveness of the meeting comprises surfacing the indication of the effectiveness of the meeting in the user interface rendered by the productivity application when accessing the document with the productivity application.

11. The method of claim 8 wherein the effectiveness of the meeting comprises an anticipated effectiveness of the meeting and wherein identifying the effectiveness of the meeting comprises identifying the anticipated effectiveness of the meeting prior to the meeting occurring.

12. The method of claim 11 wherein the effectiveness of the meeting further comprises an in-meeting effectiveness of the meeting and wherein identifying the effectiveness of the meeting comprises identifying the in-meeting effectiveness of the meeting while the meeting is occurring.

13. The method of claim 12 wherein the effectiveness of the meeting further comprises an ongoing effectiveness of the meeting and wherein identifying the effectiveness of the meeting comprises identifying the ongoing effectiveness of the meeting after the meeting has occurred.

14. The method of claim 13 wherein surfacing the indication of the effectiveness of the meeting in the user interface comprises surfacing at least one of an indication of the anticipated effectiveness of the meeting, an indication of the in-meeting effectiveness of the meeting, and an indication of the ongoing effectiveness of the meeting.

15. An apparatus comprising:

one or more computer readable storage media; and program instructions stored on the one or more computer readable storage media that, when executed by a processing system, direct the processing system to at least:

generate a meetings graph for a meeting comprising a plurality of participants, wherein the meetings graph comprises nodes and edges, wherein the edges comprise a relationship between nodes, and wherein nodes comprise participants, non-participants, documents, or other materials associated with the meeting;

monitor for a plurality of events that occur in association with the meeting at least before the meeting and after the meeting;

populate the meetings graph with the nodes and the edges representative of the plurality of events;

identify an indication of effectiveness of the meeting based at least in part on a comparison of the edges of the meetings graph to edges of a model meetings graph representative of an effective meeting; and surface the indication of the effectiveness of the meeting in a user interface to a calendar application through which to view and modify details of the meeting and to at least one other application for surfacing in one other user interface to the other application when interacting with a document, wherein the other application comprises a productivity application of a different type than the calendar application.

16. The apparatus of claim 15 further comprising the processing system that reads and executes the program instructions, wherein the effectiveness of the meeting comprises an anticipated effectiveness of the meeting, and wherein the program instructions further direct the processing system to surface at least a suggestion in the user interface for improving the anticipated effectiveness of the meeting prior to the meeting occurring.

17. The apparatus of claim 16 wherein the effectiveness of the meeting further comprises an ongoing effectiveness of the meeting, and wherein the program instructions further direct the processing system to surface at least a suggestion in the user interface for improving the ongoing effectiveness of the meeting after the meeting has occurred.

18. The apparatus of claim 16 wherein to identify the indication of the effectiveness of the meeting comprises identifying the anticipated effectiveness of the meeting prior to the meeting occurring.

19. The apparatus of claim 15 wherein the effectiveness of the meeting further comprises an in-meeting effectiveness of the meeting and wherein to identify the indication of the effectiveness of the meeting comprises identifying the in-meeting effectiveness of the meeting while the meeting is occurring.

20. The apparatus of claim 15, wherein the user interface includes an auto-improve component that, when selected, surfaces a plurality of suggestions for improving the effectiveness of the meeting.

\* \* \* \* \*